United States Patent
Dory et al.

(10) Patent No.: US 9,788,357 B2
(45) Date of Patent: Oct. 10, 2017

(54) NEAR FIELD COMMUNICATION (NFC) DATA TRANSFER

(71) Applicant: HEWLETT-PACKARD DEVELOPMENT COMPANY, L.P., Houston, TX (US)

(72) Inventors: Jon R. Dory, Fort Collins, CO (US); David H. Hanes, Loveland, CO (US); James Glenn Dowdy, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/917,395

(22) PCT Filed: Sep. 11, 2013

(86) PCT No.: PCT/US2013/059105
§ 371 (c)(1),
(2) Date: Mar. 8, 2016

(87) PCT Pub. No.: WO2015/038104
PCT Pub. Date: Mar. 19, 2015

(65) Prior Publication Data
US 2016/0219637 A1    Jul. 28, 2016

(51) Int. Cl.
*H04W 4/00* (2009.01)
*H04W 76/02* (2009.01)
*H04B 5/00* (2006.01)

(52) U.S. Cl.
CPC ........ *H04W 76/023* (2013.01); *H04B 5/0031* (2013.01); *H04B 5/0056* (2013.01); *H04W 4/008* (2013.01); *H04B 5/0068* (2013.01)

(58) Field of Classification Search
USPC ...... 455/41.1, 41.2, 41.3, 163, 557, 88, 466, 455/556.1, 558, 422.1; 370/310, 352,
(Continued)

(56) References Cited

U.S. PATENT DOCUMENTS

| | | |
|---|---|---|
| 8,107,879 B2 | 1/2012 | Pering et al. |
| 8,271,662 B1 | 9/2012 | Gossweiler, III et al. |

(Continued)

FOREIGN PATENT DOCUMENTS

| | | |
|---|---|---|
| EP | 1958470 | 8/2010 |
| EP | 2581867 | 4/2013 |

(Continued)

OTHER PUBLICATIONS

Dunnebeil, S. et al.; "Encrypted NFC Emergency Tags Based on the German Telematics Infrastructure"; 2011, 7 pages.

*Primary Examiner* — Ganiyu A Hanidu
(74) *Attorney, Agent, or Firm* — HP Inc. Patent Department

(57) ABSTRACT

A first device in accordance with an example is placed in a predefined mode in response to removing a near field communication (NFC) tag from an NFC component of the first device. A request is received from a second device to establish a connection with the first device based on data stored on the NFC tag. The first device establishes the connection with the second device and executes the predefined mode.

14 Claims, 5 Drawing Sheets

(58) Field of Classification Search
USPC .................................. 370/338, 328, 255
See application file for complete search history.

(56) References Cited

U.S. PATENT DOCUMENTS

| | | | |
|---|---|---|---|
| 8,498,572 B1 | 7/2013 | Schooley et al. | |
| 8,526,885 B2 | 9/2013 | Lin et al. | |
| 2007/0145152 A1* | 6/2007 | Jogand-Coulomb | G06K 7/10237 235/492 |
| 2008/0128505 A1* | 6/2008 | Challa | G06K 7/0008 235/462.13 |
| 2009/0046715 A1* | 2/2009 | McCoy | G06F 9/54 370/389 |
| 2010/0010721 A1* | 1/2010 | Van Vactor | F02C 9/46 701/100 |
| 2010/0012721 A1* | 1/2010 | Jain | G06K 7/10237 235/380 |
| 2010/0082448 A1* | 4/2010 | Lin | G06F 21/10 705/26.1 |
| 2012/0171952 A1* | 7/2012 | Ohira | H04M 1/72525 455/41.1 |
| 2012/0178366 A1* | 7/2012 | Levy | G06K 7/10237 455/41.1 |
| 2012/0238216 A1 | 9/2012 | Hallowell et al. | |
| 2012/0309302 A1* | 12/2012 | Buhot | H04B 5/00 455/41.1 |
| 2012/0317628 A1* | 12/2012 | Yeager | G06Q 20/204 726/5 |
| 2013/0021145 A1 | 1/2013 | Boudy | |
| 2015/0118958 A1* | 4/2015 | Jain | G06Q 20/204 455/41.1 |

FOREIGN PATENT DOCUMENTS

| | | |
|---|---|---|
| KR | 10-2013-0042397 | 4/2013 |
| WO | WO-2013038047 | 3/2013 |

* cited by examiner

NEAR FIELD COMMUNICATION (NFC) DATA TRANSFER

BACKGROUND

Connectivity between a host device (e.g., mobile device, notebook, etc) and a peripheral device (e.g., printer/fax/scanner, wireless access point, etc) is typically accomplished using software, state change switches, or some other type of peripheral login credentials. The connection process often requires specific information about the host device and/or the peripheral device.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
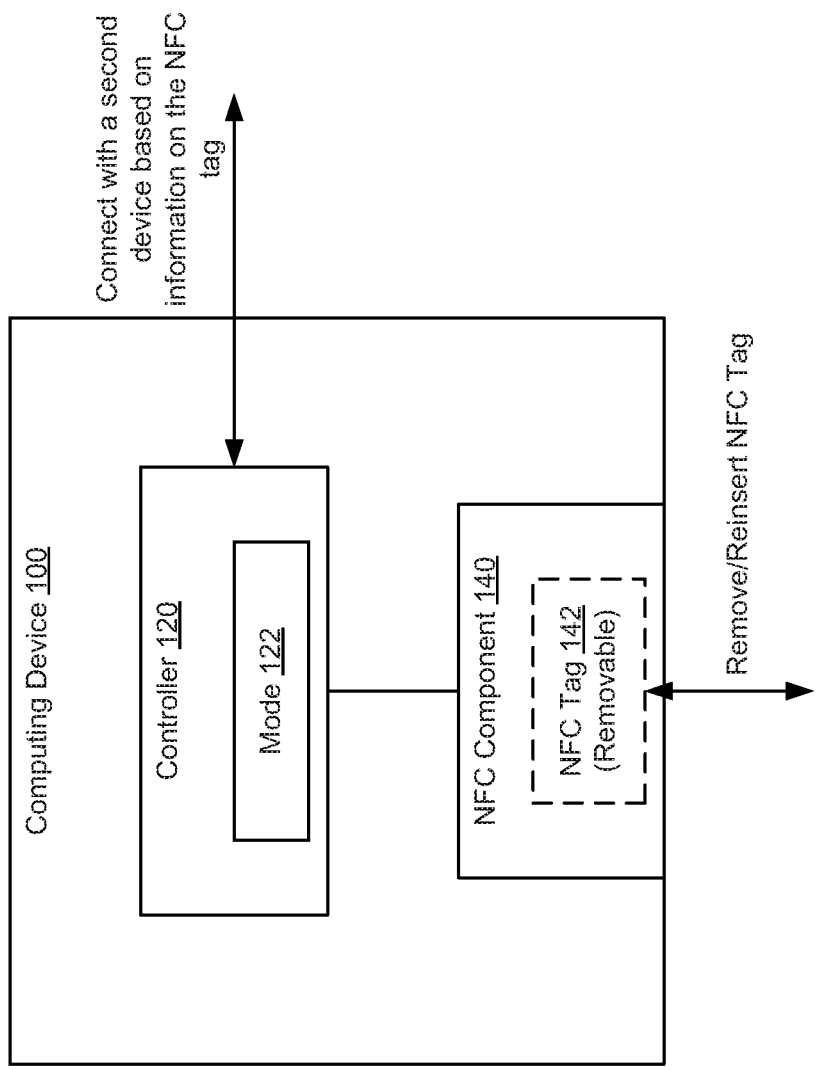
FIG. 1 illustrates an example of a computing device including a controller to place the computing device in a predefined mode when an NFC tag is removed from the computing device.

Establishing wireless connectivity between a computing device and another computing device (e.g., a peripheral device) can be burdened with technical issues such as knowing how to place the peripheral device into a discovery mode (i.e., a state change) and know strings such as service set identification (SSID), security process, login names, passwords, and other information about the peripheral device (e.g., an all-in-one system, a wireless access point, etc.). If such information about the peripheral device is lost or forgotten, connection between the computing device and a host device (e.g., a notebook computer, a smartphone, a tablet, a personal digital assistant (PDA), etc) may be difficult or impossible. One solution may be to provide the information on a near field communication (NFC) tag.

NFC is a set of standards for smartphones and similar devices to establish radio communication with each other by touching them together or by bringing them into close proximity, usually no more than a few inches. Some applications of the NFC technology include contactless transactions, data exchange, and simplified setup of more complex communications such as Wi-Fi®. Thus, NFC uses a tap-to-connect or tap-to-share technology that involves bringing two devices close together, thereby triggering the NFC functionality and performing an intended operation (e.g., connecting the devices for data sharing or performing a transaction). However, if one or both of the host device and the peripheral device are not mobile, portable, or are inconvenient to bring into close proximity, then the tap-to-share feature may not be feasible or may be too awkward to use for establishing connection between the two devices for sharing data or executing other transactions.

Accordingly, examples described herein address the above challenges by providing a computing device (e.g., a peripheral device) that includes an NFC component that houses a removable NFC tag. The NFC tag may contain, for example, data related to the identification and login credentials to allow a second computing device (e.g., a host device) to connect with the computing device. When the NFC tag is removed from the peripheral device, the peripheral device is placed in a predefined mode. In some examples, the predefined mode may include a discovery mode, a data transfer mode, a pairing mode, or any other operational mode of the peripheral device. The operational mode may be based on the type of peripheral device and/or functionality of the peripheral device. Thus, removal of the NFC tag from the peripheral device activates the operational mode in the peripheral device.

The NFC tag is brought in proximity of the host device to execute data transfer to the host device (e.g., via tapping or by close proximity). An NFC reader of the host device may read and/or receive the data. Accordingly, connection information, login credentials, identification information, security information, and other types of information that may be required to establish the connection is transferred to the host device. The connection and execution of the predefined mode may be completed after the data is received by the host device, or after the NFC tag is reinserted into the peripheral device. The connection may be via Bluetooth, Wi-Fi® Direct, wireless local area network (WLAN) connection, cellular network, ad-hoc network connection, or any other long range or short range connection.

In one example, a method for near field communication (NFC) data transfer includes placing a first device in a predefined mode in response to removing an NFC tag from an NFC component of the first device. The method includes receiving a request from a second device to establish a connection with the first device based on data stored on the NFC tag. The method also includes establishing the connection with the second device and executing the predefined mode.

In another example, a computing device includes a near field communication (NFC) component including an NFC tag and a controller. The controller is to place the computing device in a predefined mode in response to detecting that the NFC tag is removed from the NFC component. The controller is to establish a connection with a second device in response to a request for connection from the second device based on data stored on the NFC tag. The controller is further to execute the predefined mode with the second device.

In another example, a non-transitory computer-readable storage medium includes instructions that, when executed cause a controller to detect that a near field communication (NFC) tag is removed from an NFC component of a computing device. The instructions cause the controller to place the computing device in a predefined operational mode in response to the detection. The instructions cause the controller to receive a request for connection from a second device based on data contained in the NFC tag and to establish the connection with the second device and execute the predefined operational mode, in response to detecting that the NFC tag is returned to the NFC component.

FIG. 1 illustrates an example of a computing device 100 including a controller 120 to place the computing device in a predefined mode 122 when an NFC tag 142 is removed from the computing device 100. The computing device 100 can be a peripheral device such as an all-in-one system, a wireless access point, or any other device that can provide data and/or connection services to another device.

The computing device 100 includes a controller 120 and an NFC component 140, and a removable NFC tag 142 in the NFC component 140, where the NFC tag stores data usable by a second device for connecting with the computing device 100. The controller 120 can be a processor, a semiconductor-based microprocessor, an integrated circuit (IC), or any other device suitable for managing the connection of the computing device 100 with a second device and for executing the operational mode 122 of the computing device 100. The mode 122 of the computing device 100 can be a data transfer mode, a pairing mode, a discovery mode, or any other operational mode of the computing device 100.

NFC component 140 includes software, hardware, and/or firmware which can be utilized independently and/or in conjunction with the controller 120 to manage the NFC tag 142. For example, NFC component 140 houses the NFC tag 142 and may have the ability to program or reprogram the NFC tag 142 (i.e., write or rewrite data onto the NFC tag 142). In one example, if the NFC component 140 includes software and/or firmware, the NFC component can be stored on a non-volatile computer-readable medium included in or accessible to the computing device 100.

In response to detecting that the NFC tag 142 has been removed from the NFC component 140, the controller 120 places the computing device in the predefined mode 122. The predefined mode 122 may be a discovery mode, a data transfer mode, a pairing mode, or any other operational mode of the computing device 100. For example, in the discovery mode, the computing device 100 may advertise a list of services available to other devices. The list of services may include, for example, email printing services, downloadable applications, scanning services, fax services, network access, and so on. The list of services provided by the computing device 100 may be dependent on the capabilities of the computing device 100. As another example, in the data transfer mode, computing device 100 may exchange data with another computing device. As another example, in the pairing mode the computing device 100 may associate and/or connect with another device to provide services. In the pairing mode, the computing device 100 may connect with another device to perform a transaction or function.

Thus, removal of the NFC tag 142 from the computing device 100 activates/triggers the operational mode 122 in the computing device 100. For example, circuitry and/or software/firmware for executing the mode 122 may be activated at the computing device 100. It should be noted that other operational modes may be executed by the computing device 100. In certain examples, the computing device 100 is placed in an active state (e.g., discovery mode) when the NFC tag 142 is removed from the computing device 100. However, when the NFC tag 142 remains in the computing device 100, the computing device 100 is in an inactive state (e.g., not seeking devices to initiate connection activity).

The NFC tag 142 may include data to facilitate connection with the second device and/or information related to the mode 122 of the computing device. For example, the NFC tag 142 may include identification and login credentials, security information, and other information/data to facilitate the connection with the second device. The data stored in the NFC tag 142 is readable by an NFC reader of the second device and transferable to the second device.

When the NFC tag 142 is brought in close proximity or in contact with the NFC reader of the second device, transfer of data from the NFC tag 142 to the second device is initiated. The data on the NFC tag 142 may trigger or activate circuitry, software, and/or firmware in the second device to establish connectivity with the computing device 100. For example, the second device may begin to search for devices in the predefined mode 122 (e.g., pairing mode) and find the computing device 100 to already be in the mode 122, making it easier for the second device 100 to connect with the computing device 100.

In some example, the connection is established once the data is transferred from the NFC tag 142 to the second device. In other examples, the connection is established after the NFC tag 142 is reinserted into the computing device 100. In this example, reinserting the NFC tag 142 completes the connection process between the computing device 100 and the second device. In either example, once the connection has been established, the mode 122 can be executed between the computing device 100 and the second device. For example, once the connection is established, data (e.g., content, files, etc) can be exchanged between the computing device 100 and the second device.

Figure 2:
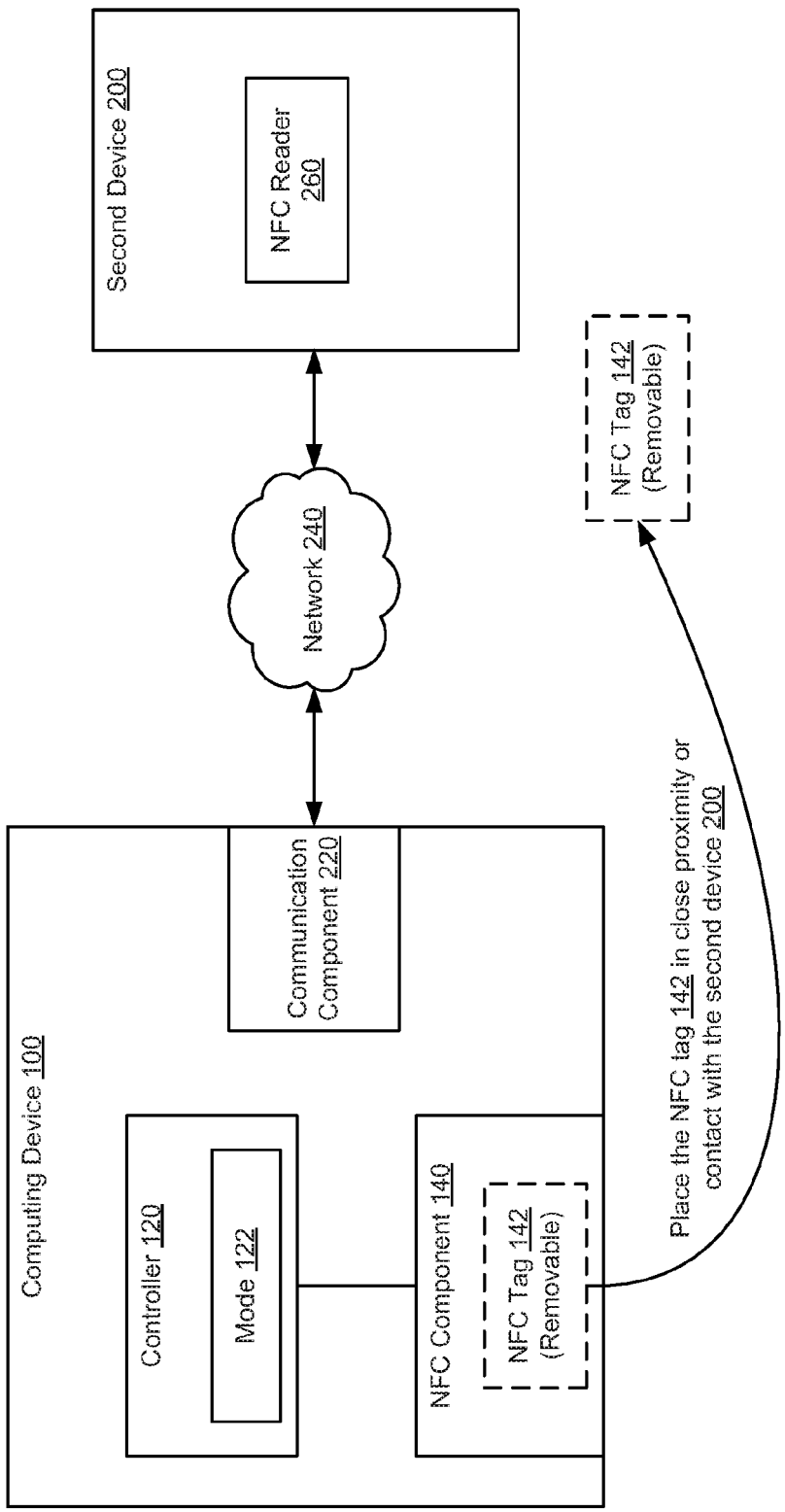
FIG. 2 illustrates another example of a computing device including a controller to place the computing device in a predefined mode when an NFC tag is removed from the computing device.

FIG. 2 illustrates an example of a computing device 100 including a controller 120 to place the computing device 100 in a predefined mode 122 when an NFC tag 142 is removed from the computing device 100 and transported to a second device 200. In the example of FIG. 2, computing device 100 includes a communication component 220 for establishing a wireless connection with the second device 200. Communication component 220 is a hardware component, such as a network interface controller, a wireless radio, a Bluetooth component, and/or infrared component to communicate wirelessly with second device 200 over a network 240. The wireless network 240 can be a WLAN, wireless personal area network (WPAN), cellular network, Bluetooth network, ad-hoc network, or any other network.

As noted above, the controller 120 initially detects when the NFC tag 142 is removed from the NFC component 140 of the computing device 100. In response to the detection, the controller 120 places the computing device in a particular mode 122. For example, the controller 120 may activate a circuitry, software, and/or firmware to place the computing device 100 in a discovery mode, a pairing mode, a data transfer mode, or any other operational mode.

When the NFC tag 142 is brought in close proximity or brought in contact with the second device 200, the NFC reader 260 of the second device 200 reads the data stored on the NFC tag 142. In some examples, the data includes connection information, identification and login information, and other information that may be required to establish a connection with the computing device 100. In certain examples, the data from the NFC tag 142 may trigger the activation of circuitry, software, and/or firmware in the second device 200 to search for the computing device 100, thus making it easy for the second device 200 to connect with the computing device 100. In some examples, the second device 200 may send a request for connection to the computing device 100 (e.g., since the second device 200 has information related to the location, identity, and/or services provided by the computing device). Subsequently, the computing device 100 can establish a wireless connection with the second device 200 and execute the predefined mode 122 (e.g., data transfer, pairing, provide services, etc) with the second device 200 using the communication component

220. In certain examples, the connection is established after the NFC tag 142 is reinserted/returned to the NFC component 140 of the computing device 100. In such an example, the connection process is completed when the NFC tag 142 is detected to be inserted into the computing device 100.

Figure 3:
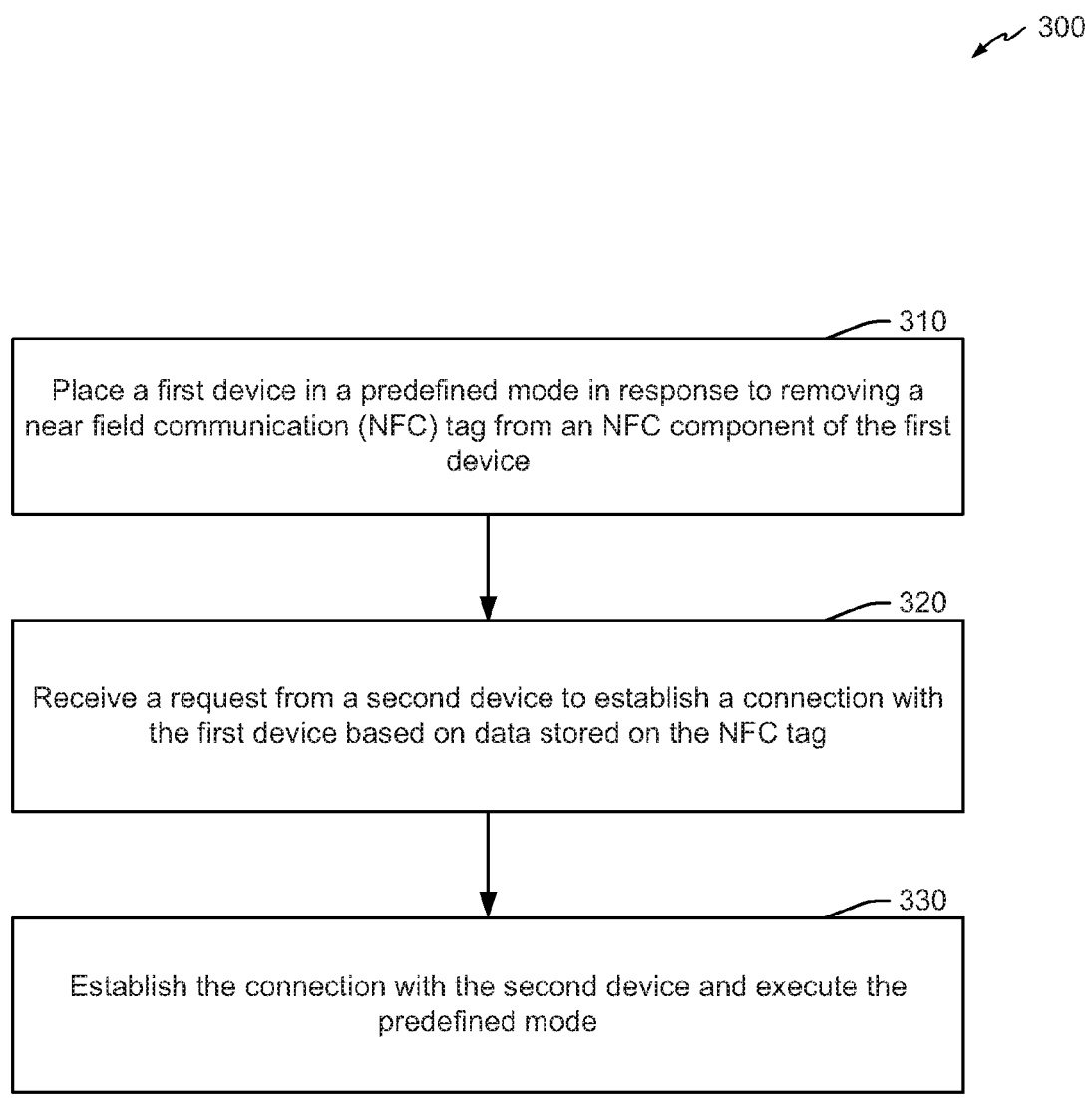
FIG. 3 is an example flowchart illustrating a method for NFC data transfer between a first device and a second device.

FIG. 3 is an example flowchart illustrating a method for NFC data transfer between a first device and a second device. Method 300 may be implemented, for example, in the form of executable instructions stored on a non-transitory computer-readable storage medium and/or in the form of electronic circuitry.

Method 300 includes placing a first device in a predefined mode in response to removing an NFC tag from an NFC component of the first device, at 310. For example, the first device can be placed in a pairing mode, a data transfer mode, or a discovery mode in response to detecting that the NFC tag has been removed from the first device. In other examples, the first device is removed from a passive mode and placed in an active mode, in response to the removal.

Method 300 includes receiving a request from a second device to establish a connection with the first device based on data stored on the NFC tag, at 320. For example, the data stored on the NFC tag can be transferred to the second device, when the NFC tag is brought in close proximity or in contact with the second device. The data may include login credentials, identification information, and other information to facilitate a connection with the first device. In certain examples, the data from the NFC tag causes the second device to search for devices in a particular mode, and to find the first device in the particular mode.

Method 300 also includes establishing the connection with the second device and executing the predefined mode, at 330. For example, because the second device knows the location and/or identity of the first device, the second device may send a request for connection, and in response, the first device establishes the connection and executes the predefined mode. In some examples, the method 300 of FIG. 3 includes additional steps in addition to and/or in lieu of those depicted in FIG. 3.

Figure 4:
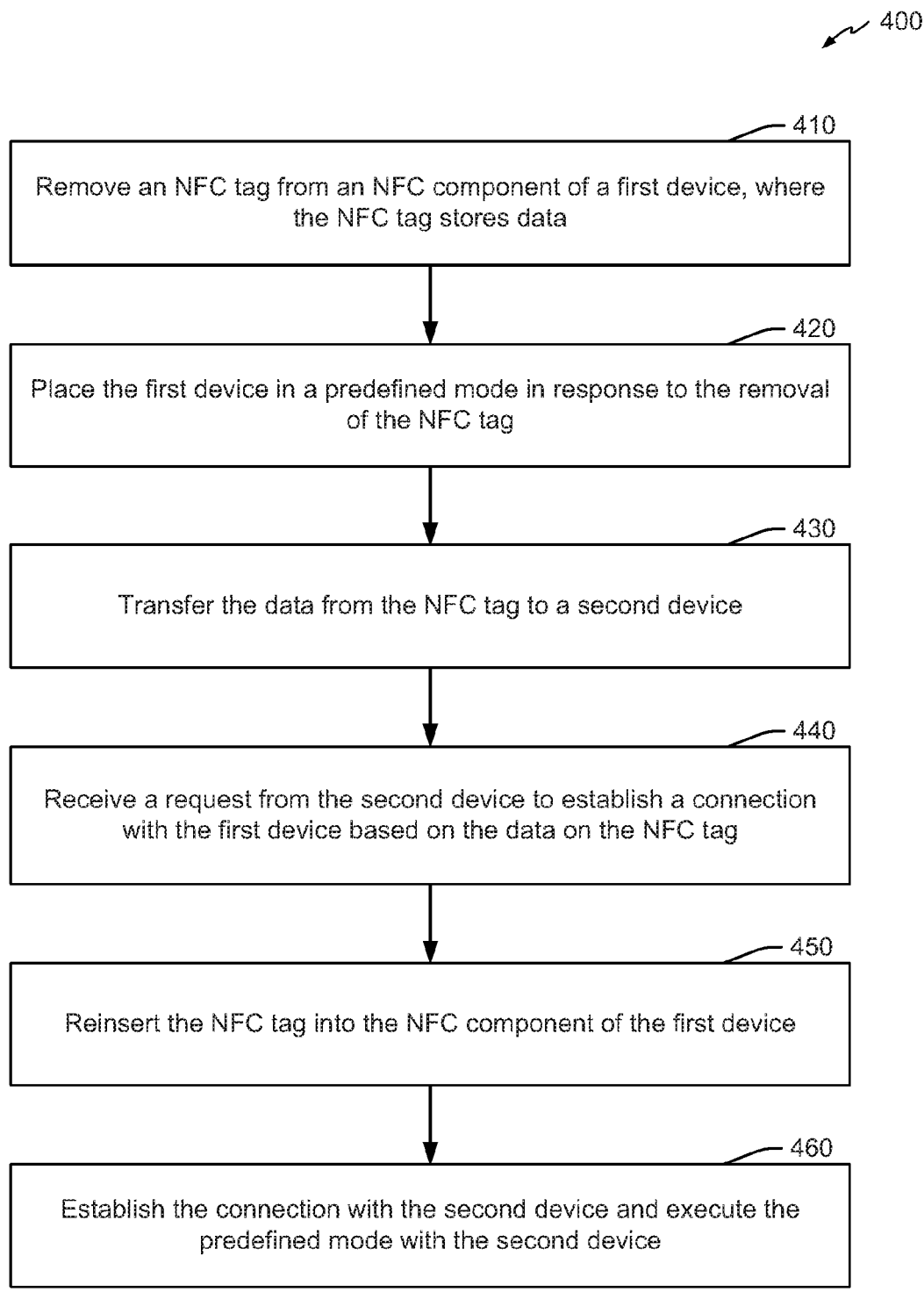
FIG. 4 is another example of a flowchart illustrating a method for NFC data transfer between a first device and a second device.

FIG. 4 is an example flowchart illustrating a method for NFC data transfer between a first device and a second device. Method 400 may be implemented, for example, in the form of executable instructions stored on a non-transitory computer-readable storage medium and/or in the form of electronic circuitry.

Method 400 includes removing an NFC tag from an NFC component of a first device, where the NFC tag stores data, at 410, and placing the first device in a predefined mode in response to the removal of the NFC tag, at 420. For example, the first device may be placed in a pairing mode, a data transfer mode, a discovery mode, or any other operational mode in response to the removal of the NFC tag. In other examples, the first device is placed in an active mode (from a passive mode) in response to the removal.

Method 400 includes transferring the data from the NFC tag to a second device, at 430. For example, data stored on the NFC tag is transferred to a second device when the NFC tag is placed in close proximity or in contact with the second device via NFC transfer protocol.

Method 400 includes receiving a request from the second device to establish a connection with the first device based on the data on the NFC tag, at 440. For example, the data on the NFC tag may include location, identification, login credentials of the first device, communication protocols used by the first device, or any other information that may facilitate connectivity with the first device. Based on the data, the second device may send a connection request.

Method 400 includes reinserting the NFC tag into the NFC component of the first device, at 450, and establishing the connection with the second device and executing the predefined mode with the second device, at 460. For example, the connection and execution processes are complete when the NFC tag is replaced into the first device. In some examples, the method 400 of FIG. 4 includes additional steps in addition to and/or in lieu of those depicted in FIG. 4.

Figure 5:
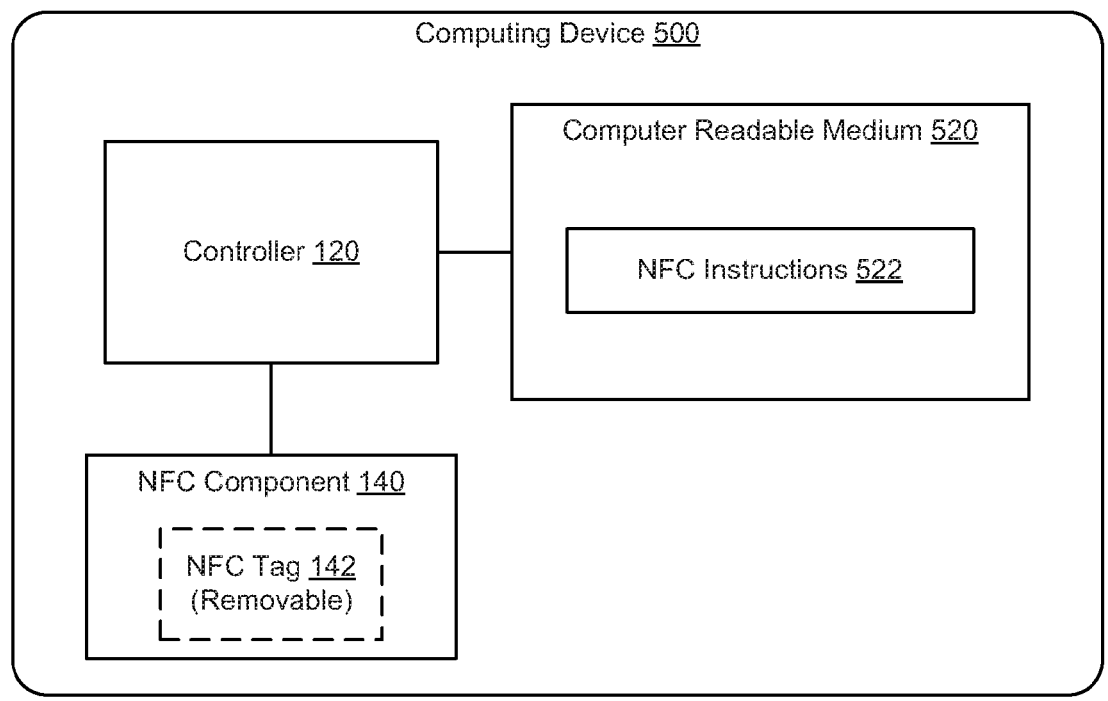
FIG. 5 illustrates an example of a computing device including a computer-readable medium having instructions to place the computing device in a predefined mode when an NFC tag is removed from the computing device.

FIG. 5 illustrates an example of a computing device including a computer-readable medium having instructions to place the computing device in a predefined mode when an NFC tag is removed from the computing device. The computing device 500 can include a non-transitory computer-readable medium 520. The non-transitory computer-readable medium 520 can include instructions 522 that if executed by a controller 120 can cause the controller 120 to perform the functionality described below.

For example, the NFC instructions 522 are executable by the controller 120 to detect that an NFC tag 142 is removed from an NFC component 140 of the computing device 500, and to place the computing device 500 in a predefined operational mode in response to the detection. The NFC instructions 522 are further executable by the controller 120 to receive a request for connection from a second device based on data contained in the NFC tag 142, and to establish the connection with the second device and execute the predefined operational mode, in response to detecting that the NFC tag 142 is returned to the NFC component 140.

The techniques described above may be embodied in a computer-readable medium for configuring a computing system to execute the method. The computer-readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and obvious types of computer-readable media may be used to store the software modules discussed herein. Computing systems may be found in many forms including but not limited to mainframes, minicomputers, servers, workstations, personal computers, notepads, personal digital assistants, tablets, smartphones, various wireless devices and embedded systems, just to name a few.

In the foregoing description, numerous details are set forth to provide an understanding of the present disclosure. However, it will be understood by those skilled in the art that the present disclosure may be practiced without these details. While the present disclosure has been disclosed with respect to a limited number of examples, those skilled in the art will appreciate numerous modifications and variations therefrom. It is intended that the appended claims cover such modifications and variations as fall within the true spirit and scope of the present disclosure.

What is claimed is:

1. A method comprising:
 activating a predefined mode of a first device in response to removing a near field communication (NFC) tag from an NFC component of the first device;

transferring data from the NFC tag to the second device;
receiving a request from a second device to establish a wireless connection with the first device based on data stored on the NFC tag;
in response to the request, establishing the wireless connection with the second device and executing the predefined mode; and
reinserting the NFC tag into the NFC component of the first device.

2. The method of claim 1, wherein the predefined mode includes at least one of a discovery mode, a data transfer mode, and a pairing mode.

3. The method of claim 1, wherein the establishing of the wireless connection with the second device is performed in response to reinserting the NFC tag into the NFC component of the first device.

4. The method of claim 1, wherein the establishing of the wireless connection includes establishing at least one of a Bluetooth connection, a Wi-Fi Direct connection, a wireless local area network (WLAN) connection, a cellular network connection, and an ad-hoc network connection with the second device.

5. The method of claim 1, wherein the activating of the predefined mode includes placing the first device in an active mode to advertise services offered by the first device.

6. The method of claim 1, wherein the activating of the predefined mode includes activating at least one of electronic circuitry and software code to execute the predefined mode.

7. The method of claim 1, wherein the NFC tag includes data readable by an NFC reader of the second device, wherein the data includes at least one of connection information, security information, identification information of the first device, and information related to the predefined mode.

8. A computing device comprising:
a near field communication (NFC) component including an NFC tag; and
a controller to:
initiate a predefined mode in the computing device in response to removal of the NFC tag from the NFC component;
establish a wireless connection with a second device in response to a wireless request for the wireless connection from the second device following transfer of data to the second device from the NFC tag;
execute the predefined mode with the second device; and
deactivate the predefined mode in the computing device following reinsertion of the NFC tag into the NFC component of the first device.

9. The computing device of claim 8, wherein the predefined mode includes at least one of a discovery mode, a data transfer mode, and a pairing mode.

10. The computing device of claim 8, wherein the data is transferred to the second device from the NFC tag when the NFC tag is placed in close proximity or is in contact with the second device, the data including at least one of connection information, security information, an identification of the computing device, and information related to the predefined mode.

11. The computing device of claim 9, wherein the controller is to establish the wireless connection with the second device in response to detecting that the NFC tag is returned to the NFC component, and the NFC tag initiates activation of at least one of an electronic circuitry and software code at the second device to establish the connection.

12. The computing device of claim 8, further comprising a communication component to connect with the second device, the computing device providing at least one of data and service to the second device.

13. A non-transitory computer-readable storage medium comprising instructions that, when executed cause a computing device to at least:
detect that a near field communication (NFC) tag has been removed from an NFC component of the computing device;
activate a predefined first operational mode in the computing device in response to the detection;
receive a request for a wireless connection from a second device based on in response to data transferred to the second device from the NFC tag;
in response to the request, establish the wireless connection with the second device in response to detecting that the NFC tag is returned to the NFC component; and
deactivate the first operational mode in the computing device following reinsertion of the NFC tag into the NFC component of the computing device.

14. The non-transitory computer-readable storage medium of claim 13, wherein the predefined operational mode includes at least one of a discovery mode, a data transfer mode, and a pairing mode.

* * * * *

UNITED STATES PATENT AND TRADEMARK OFFICE
CERTIFICATE OF CORRECTION

| | |
|---|---|
| PATENT NO. | : 9,788,357 B2 |
| APPLICATION NO. | : 14/917395 |
| DATED | : October 10, 2017 |
| INVENTOR(S) | : Jon R. Dory, David H. Hanes and James Glenn Dowdy |

It is certified that error appears in the above-identified patent and that said Letters Patent is hereby corrected as shown below:

In the Claims

Column 7, Line 1 (Claim 1): replace "the" before "second" with "a"
Column 8, Line 34 (Claim 13): delete "based on" after "device"

Signed and Sealed this
Fifth Day of June, 2018

Andrei Iancu
*Director of the United States Patent and Trademark Office*